United States Patent
Swanson et al.

(10) Patent No.: US 7,154,326 B2
(45) Date of Patent: Dec. 26, 2006

(54) DITHER AMPLITUDE CORRECTION FOR CONSTANT CURRENT DRIVERS

(75) Inventors: Dirk E. Swanson, Canton, MI (US);
Matthew T. LaDuke, Warren, MI (US);
Mark L. Hopper, Ypsilanti, MI (US);
Robert J. Bolduc, Allen Park, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 81 days.

(21) Appl. No.: 11/108,320

(22) Filed: Apr. 18, 2005

(65) Prior Publication Data
US 2006/0232306 A1    Oct. 19, 2006

(51) Int. Cl.
*H03K 17/687* (2006.01)

(52) U.S. Cl. .................... 327/427; 327/434; 327/307; 327/73

(58) Field of Classification Search ............... 327/307, 327/427, 434, 74, 76
See application file for complete search history.

(56) References Cited

U.S. PATENT DOCUMENTS

| | | | |
|---|---|---|---|
| 3,954,024 A | 5/1976 | Staats | 74/5.41 |
| 4,103,695 A | 8/1978 | Aono | 137/1 |
| 4,121,547 A | 10/1978 | Asano | 123/687 |
| 4,130,863 A | 12/1978 | Schweitzer et al. | 700/38 |
| 4,503,828 A | 3/1985 | Ohgami et al. | 123/694 |
| 4,546,403 A | 10/1985 | Nielsen | 361/154 |
| 5,200,911 A | 4/1993 | Ishikawa et al. | 701/43 |
| 5,373,400 A * | 12/1994 | Kovacs | 327/74 |
| 5,451,900 A | 9/1995 | Haga et al. | 330/10 |
| 5,451,947 A | 9/1995 | Morrison | 341/131 |
| 5,673,166 A | 9/1997 | Hoffman | 361/160 |
| 5,685,149 A | 11/1997 | Schneider et al. | 60/528 |
| 5,924,703 A | 7/1999 | Ichimaru | 280/5.515 |
| 6,016,454 A | 1/2000 | Ichimaru | 701/37 |
| 6,067,490 A | 5/2000 | Ichimaru et al. | 701/37 |
| 6,674,789 B1 | 1/2004 | Fardoun et al. | 375/132 |
| 6,729,601 B1 | 5/2004 | Freisinger et al. | 251/129.05 |
| 2002/0002817 A1 | 1/2002 | Keller | 60/39.02 |
| 2002/0145550 A1 | 10/2002 | Korkala | 341/131 |
| 2002/0196445 A1 | 12/2002 | McClary et al. | 356/475 |
| 2003/0201414 A1 | 10/2003 | Freisinger et al. | 251/30.03 |
| 2003/0230266 A1 | 12/2003 | Ekdahl et al. | 123/90.15 |
| 2004/0011339 A1 | 1/2004 | Sanchez et al. | 123/520 |

FOREIGN PATENT DOCUMENTS

| | | |
|---|---|---|
| JP | 62081011 | 4/1987 |
| JP | 4248059 | 6/1993 |
| JP | 2000283325 | 10/2000 |

OTHER PUBLICATIONS

Technical Data Sheet #TD1400AX, Axiomatic Global Electronic Solutions, PWM Controlled Solenoid Driver (DIN rail mount) pp. 1-5.
MOOG N123-001 Series, Snap Trac Proportional Solenoid Driver.

* cited by examiner

*Primary Examiner*—Long Nguyen
(74) *Attorney, Agent, or Firm*—Brinks Hofer Gilson & Lione

(57) ABSTRACT

In satisfying the above need, as well as overcoming the enumerated drawbacks and other limitations of the related art, the present invention provides an improved switched driver circuit. As disclosed above, there is a need to compensate for the high impedance load characteristics in certain implementations of hysteretic switching constant current drivers. The switching waveform of switching constant current driver circuits may be modified in such a way that retains the important dither characteristics and improves system level performance.

18 Claims, 3 Drawing Sheets

DITHER AMPLITUDE CORRECTION FOR CONSTANT CURRENT DRIVERS

BACKGROUND

1. Field of the Invention

The present invention generally relates to switched driver circuit for generating a switched drive signal including a dithering signal.

2. Description of Related Art

Many electronic control module products make use of constant current output driver ICs. The purpose of these circuits is to provide a constant current through a system load of interest. In automotive applications, typical loads are: transmission pressure control solenoids, idle bypass air valves, etc. Constant current driver circuits are usually implemented using either "linear" or "switching" approaches. Linear constant current drivers are usually less expensive, but generate significant heat. Switching constant current driver can be more expensive, but minimize heat generation.

When using constant current drivers, another common feature is a superimposed "dither" frequency. The dither frequency is much less than primary switching frequency. The dither switching waveform is typically used to keep the solenoid pintle in constant motion thereby significantly reducing the effects of static friction. The two important characteristics of the dither waveform are the dither frequency and the dither amplitude. To be effective, the dither frequency must be in the normal response range of the particular solenoid and the dither amplitude must be of sufficient magnitude to move the solenoid pintle the desired amount.

A common circuit topology for a switching constant current driver is a hysteretic control approach. This topology works by switching the output drive transistor "on and off" while monitoring the actual load current. In a low side configuration, when the output current falls below the lower hysteresis threshold, the drive transistor is turned "on". When the current rises above the upper hysteresis threshold, the drive transistor is turned "off".

Therefore the primary switching frequency is determined primarily by the actual load impedance. Unfortunately, when the load impedance increases to a point where the primary switching frequency approaches the desired dither frequency, the effectiveness of the dither waveform can be greatly reduced due to a reduction in the dither amplitude.

In view of the above, it is apparent that there exists a need for an improved driver circuit.

SUMMARY

In satisfying the above need, as well as overcoming the enumerated drawbacks and other limitations of the related art, the present invention provides an improved driver circuit.

As disclosed above, there is a need to compensate for the high impedance load characteristics in certain implementations of hysteretic switching constant current drivers. As described below, the driver signal of a switching constant current driver circuit may be modified in such a way that retains important dither characteristics and improves system level performance.

Accordingly, a switched driver circuit is provided to generate a switch drive signal that includes a dither waveform. The switched driver circuit includes a dither generator circuit, a first comparator a second comparator, a gate control circuit, and a dither correction circuit. The dither generator circuit has a clock input and generates a dither signal based on the clock input. An upper threshold is combined with the dither signal to create a dithered upper threshold. By evaluating the dithered upper threshold and a feedback signal, the first comparator generates an upper threshold signal indicating if the switched drive signal is above the dithered upper threshold. Similarly, a lower threshold is combined with the dither signal to create a dithered lower threshold. The second comparator evaluates the dithered lower threshold and the feedback signal to create a lower threshold signal indicating the switched drive signal is below the dithered lower threshold.

The gate control circuit is in electrical communication with the first and second comparator to receive the upper and lower threshold signal. By controlling a transistor in electrical series with the load, the gate control circuit generates the switched drive signal to provide a constant current through the load. Also in electrical communication with the first and second comparator, the dither correction circuit suspends the dither signal based on a magnitude of the switched drive signal. For example, the dither signal may be suspended when the switched drive signal does not reach either the dithered upper or lower threshold within a predefined time period.

In another aspect of the present invention, the dither correction circuit is configured to selectively suspend a dither correction signal based on either one of or both of the upper and lower threshold signal. Further, the dither correction circuit is configured to enable the dither signal when a second predefined time period expires.

Further objects, features and advantages of this Invention will become readily apparent to persons skilled in the art after a review of the following description, with reference to the drawings and claims that are appended to and form a part of this specification.

DETAILED DESCRIPTION

Figure 1:
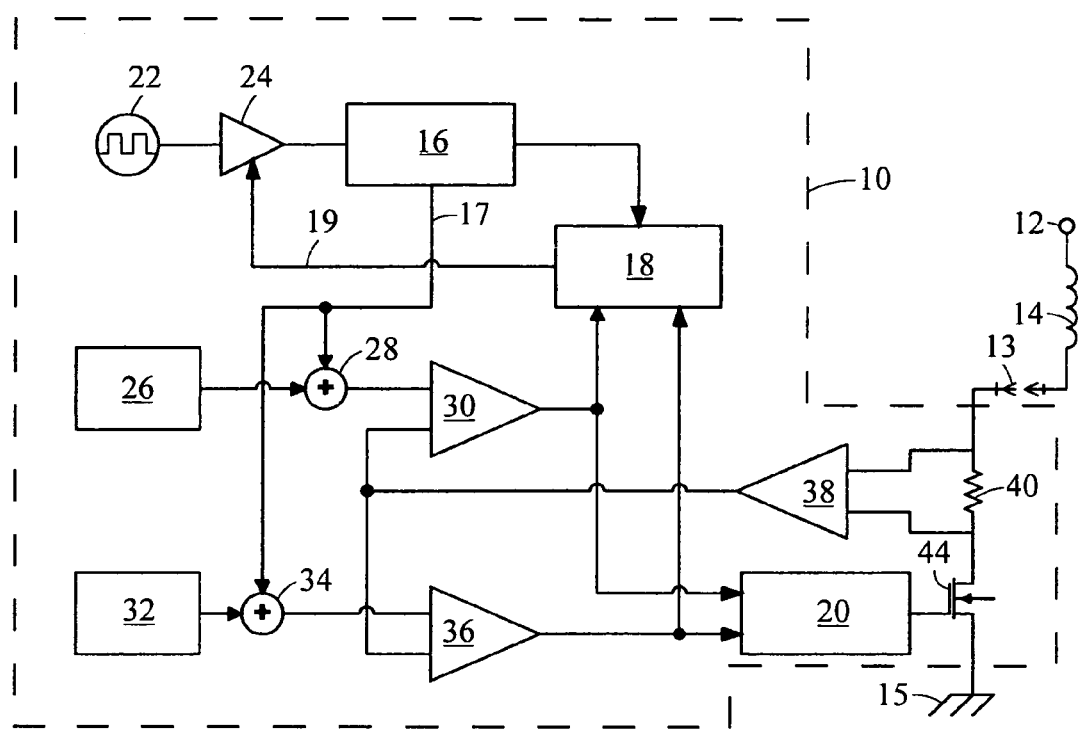
FIG. 1 is a block diagram of a switched driver circuit in accordance with the present invention.

Referring now to FIG. 1, a driver circuit, shown as a switched driver circuit 10, embodying the principles of the present invention is illustrated therein. As its primary components, the switched driver circuit 10 includes a dither generator circuit 16, a dither correction circuit 18, and a gate control circuit 20.

A solenoid 14 is connected to a power supply 12. The switched driver circuit 10 is connected in electrical series with the solenoid 14 and provides an electrical path to ground 15 for the solenoid 14. In addition, an electrical connector 13 may be used to couple the solenoid 14 to the switched driver circuit 10. The switched driver circuit 10 is configured to provide a constant current through the solenoid 14 using a hysteretic approach. Further, the switched driver circuit 10 implements a dither waveform to oscillate the pintle of the solenoid 14.

To implement the dither waveform, the clock generator 22 provides a clock signal to the buffer 24. The buffer 24 selectively communicates the clock signal to a dither generator 16. The dither generator 16 creates a dither signal 17 that is provided to summer 28 and summer 34. In addition, an upper threshold 26 is provided to the summer 28 and combined with the dither signal 17. The result of summer 28 is a dithered upper threshold that is provided to a first input of comparator 30. A feedback loop is created based on the current flow through resistive element 40. The voltage across resistive element 40 is scaled by amplifier 38 and provided to a second input of comparator 30. The result of summer 28 and the feedback signal from amplifier 38 is evaluated by comparator 30. The result from comparator 30 is provided to the gate control circuit 20 and the dither correction circuit 18.

Similarly, a lower threshold 32 is provided to summer 34 and combined with the dither signal 17 to form a dithered lower threshold. The result from summer 34 is provided to comparator 36. Comparator 36 evaluates the results from summer 34 and the feedback signal from amplifier 38. The results from comparator 36 are also provided to gate control circuit 20 and dither correction circuit 18.

The gate control circuit 20 utilizes the result from comparator 30 and comparator 36 to manipulate the drive transistor 44 to implement a switched driving signal including a superimposed dither waveform. The dither correction circuit 18 generates a dither correction signal 19 based on the output of comparator 30, the output of comparator 36, and an output from the dither generator 16. The dither correction signal 19 is provided to the buffer 24. If certain dither waveform parameters are not met the buffer 24 is disabled, thereby suspending the clock input to the dither generator circuit 16. Accordingly, the dither correction circuit 18 suspends the dither correction signal 17 to achieve a full dither amplitude and provide a switched drive signal much closer to the desired drive signal.

Figure 2:
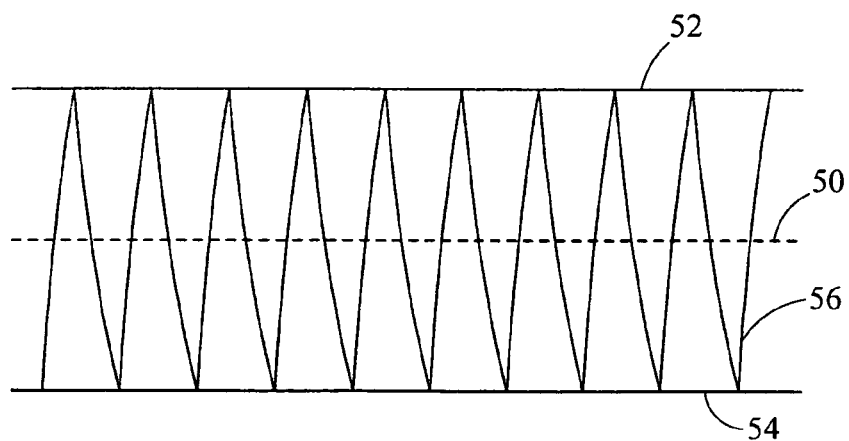
FIG. 2 is a graph of a basic switching drive signal.

FIG. 2 shows the basic characteristics of a typical hysteretic switching constant current controller. The target current is indicated by dashed line 50. While the actual output current waveform is shown as an exponential switching waveform denoted by reference numeral 56. The upper hysteretic threshold is shown as line 52 and lower hysteretic threshold is shown as line 54. Ideally, the average output current is the average of the upper and lower thresholds.

The output transistor 44 is switched on when the current reaches the lower threshold 54 and switched off when the current reaches the upper threshold 52. Switching in this manner keeps the actual output current waveform 56 within the bounds of the upper and lower threshold 52, 54. The switching frequency is not directly controlled by the driver circuit 10; rather it is defined primarily by the load impedance. A lower inductance load will switch faster, while a high inductance load will switch slower.

Figure 3:
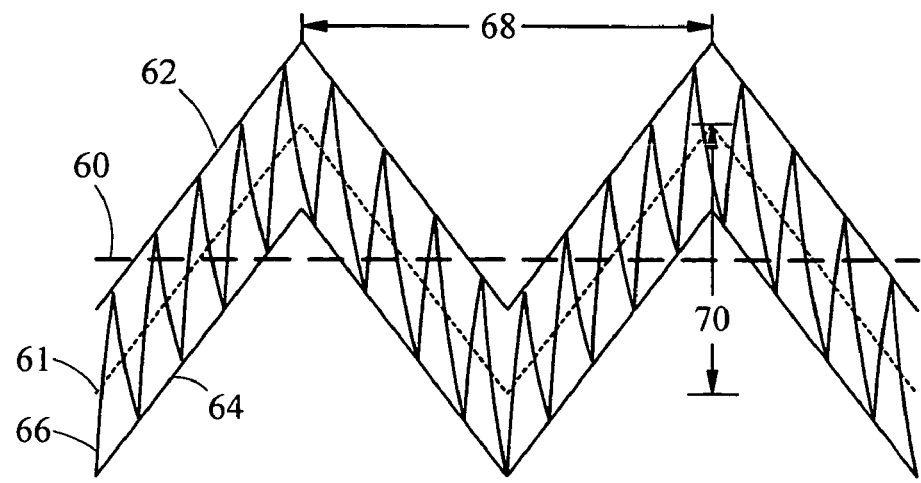
FIG. 3 is a graph of a switching drive signal including a superimposed dither waveform.

Now referring to FIG. 3, a graph is provided that illustrates a switched drive signal with a superimposed dither waveform. The commanded current is denoted by dashed line 60, while commanded dither current is denoted by dashed line 61 and the actual output current waveform is denoted by line 66. The dithered upper threshold is shown as line 62 and the dithered lower threshold is shown as line 64. The superimposed dither waveform is accomplished by varying the dithered upper and lower threshold 62, 64, in effect creating triangular upper and lower threshold waveforms. In most systems, the dither frequency is predefined, therefore, the dithered upper and lower threshold 62, 64 change from a positive to a negative slope at predetermined time intervals. Accordingly, the dither period is shown at reference numeral 68 and the dither amplitude is shown by reference numeral 70. For optimum performance, the dither frequency should be much less than the primary switching frequency. A common rule of thumb is that the primary switching frequency should be equal to eight times the dither frequency.

Figure 4:
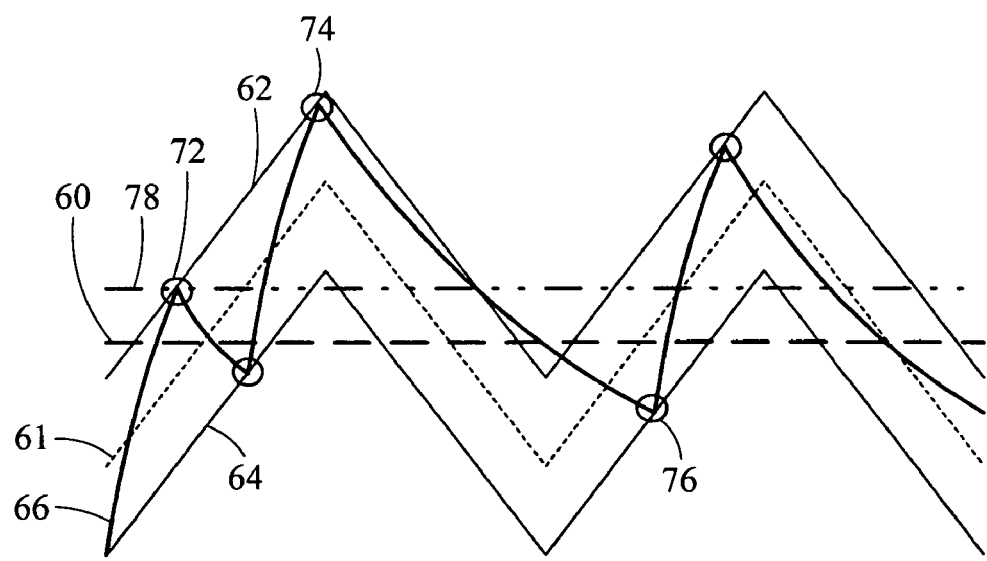
FIG. 4 is a switching drive signal including a superimposed dither waveform that does not achieve full dither amplitude.

In situations where the dither frequency approaches the primary switching frequency, the dither waveform can be disrupted. FIG. 4 shows a situation where the load impedance is sufficiently high such that the dither frequency is reduced and approaches the actual primary switching frequency. In this situation, two switch events 72, 74 are realized on the positive (rising) portion of the waveform; but the negative (falling) portion of the waveform reaches the lower threshold 64 at switch event 76 before achieving the full dither amplitude. This is due to the fact that the falling (discharging) portion of the actual current output waveform 66 is switching slower than the dither waveform superimposed on the dithered upper and lower thresholds 62, 64. Therefore, the dither amplitude is reduced and the actual average current 78 is higher than expected, resulting in an increased actual versus commanded current error.

By suspending the dither signal using the implementation provided in FIG. 1, the full dither amplitude 70 can be achieved. The dither period 68 consists of one positive slope segment and one negative slope segment. Each positive slope segment does not begin until the actual output current waveform 66 has reached the dithered lower threshold 64 during the previous negative slope segment. Similarly, each negative slope segment does not begin until the actual output current waveform 66 has reached the dithered upper threshold 62 during the previous positive slope segment.

Figure 5:
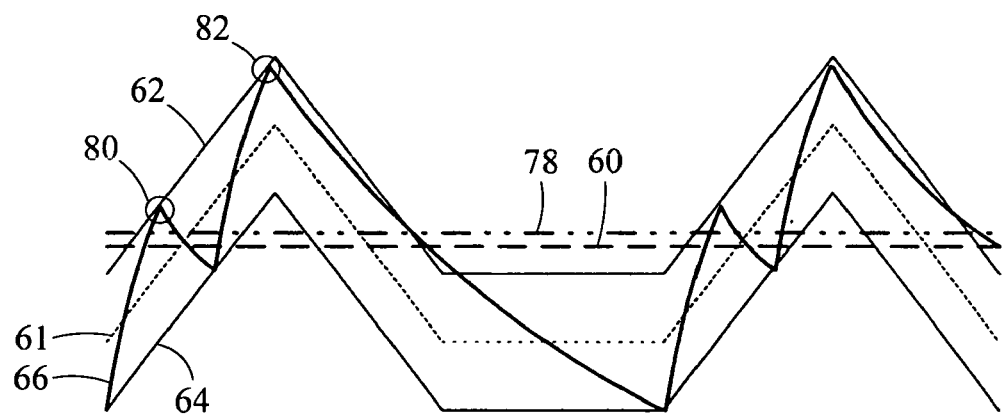
FIG. 5 is a graph of a switching drive signal with a superimposed dither waveform that has been corrected to achieve full dither amplitude.

FIG. 5 shows an example waveform with the dither signal suspended to achieve full dither amplitude. During the positive slope segment, the actual output current waveform 66 has reached the dithered upper threshold 62 at switch events 80 and 82, therefore the negative slope segment is allowed to occur normally. During the negative slope segment following switch event 82, the output current waveform 66 did not reach the dithered lower threshold 64 during a predefined time period, specifically ½ of the dither period 68. Therefore, the dithered upper and lower threshold 62, 64 remain at the values used at the end of the dither period 68 until the actual output current waveform 66 does reach the dithered lower threshold 64. Once the dithered lower threshold 64 has been achieved, the next positive slope segment is allowed to begin and the process starts over.

Figure 6:
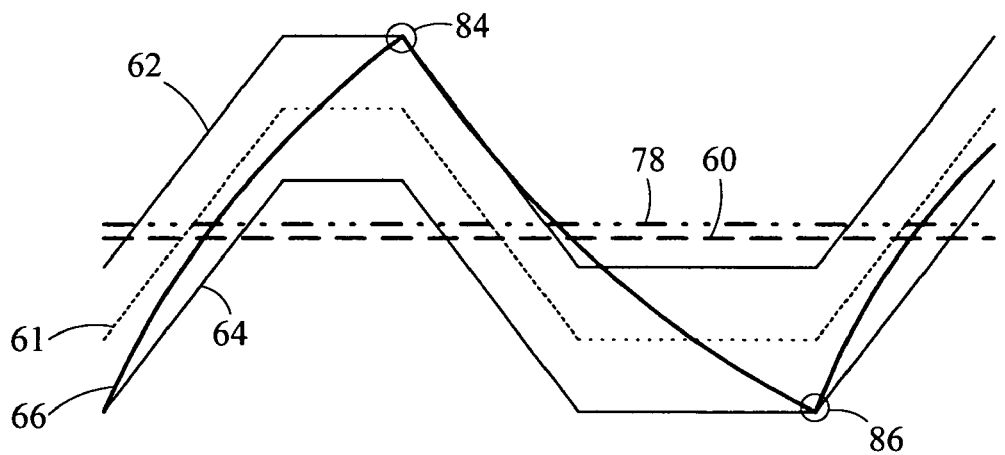
FIG. 6 is a graph of another drive signal including a superimposed dither waveform that is corrected to achieve a full dither amplitude.

FIG. 6 illustrates a more extreme example. The actual output waveform 66 does not reach the dithered upper threshold 62 within ½ of the dither period 68. Therefore, the dither signal is suspended and the dithered upper and lower thresholds 62, 64 remain at a constant valve until the actual output current waveform 66 reaches the dithered upper threshold 62 at switch event 84. Further, the actual current output waveform 66 does not reach the lower limit 64 within the subsequent predefined time period, ½ of the dither period 68. Therefore, once again the dither signal is suspended and the dithered upper and lower threshold 62, 64 remain constant until the actual output waveform 66 reaches the dithered lower threshold 64 at switch event 86. Accordingly, in this situation, both the positive and negative period segments are delayed to allow the actual output current waveform 66 to reach both the dithered upper and lower thresholds 62, 64.

FIGS. 5 and 6 show that the dither threshold levels have been adjusted to allow the switching waveform to achieve the desired dither amplitude. An additional desirable outcome in FIGS. 5 and 6 is that the actual average current 78 is much closer to the commanded average current 60. In FIG. 4, the actual output current waveform 66 does not achieve the full dither amplitude, particularly with respect to the dithered lower threshold 64. This results in a situation where the positive peaks of the actual output current waveform 66 relative to the commanded dither current 61 are greater in magnitude than the negative switching peaks of the actual output current waveform 66. While calculating the actual average current is more complex, a first order approximation of the average current can be calculated as the average of the positive and negative switching peaks. With this first order approximation, it is easy to determine that the actual average current 78 in FIGS. 5 and 6 is much closer to the commanded average current 60 than that of FIG. 4.

While the above description has concentrated on a switched driver circuit implementation, the same techniques may be readily applied to improve the system performance of a linear driver circuit, by suspending the dither generator to accommodate the effects of high inductance loads. In a linear driver circuit, the upper and lower dither threshold are not required. The nominal dither target as shown in waveform 61 is required for a linear driver. If the actual load current lags the target dither waveform 61; the techniques described in this would be applied in a similar manner.

The dither correction circuit 18 continuously monitors the status of comparator 30 and 36, as well as, the status of the dither generator circuit 16. The dither generator circuit 16 continues to operate as long as the internal clock input is provided. Under normal operation, the dither correction circuit 18 will detect that the upper and lower thresholds 26, 32 are met during each dither ½ period and will continue to provide the clock signal to the dither generator circuit 16.

In situations where the primary switching frequency approaches the dither frequency, the dither correction circuit 18 detects when the upper or lower threshold 26, 32 is not achieved during a dither ½ period. The dither correction circuit 18 then disables the internal clock input to the dither generator circuit 16. This stalls the application of the dither signal to comparators 30 and 36. Once the applicable threshold has been achieved, the dither correction circuit 18 will re-enable the internal clock input to the dither generator circuit 16. This restarts the application of the dither signal to comparators 30 and 36.

Another feature includes additional logic or registers in the dither correction circuit 16 to allow the user to individually choose whether the amplitude correction is applied on the positive dither ½ period (thereby correcting the upper dither threshold), negative dither ½ period (thereby correcting the lower dither threshold), or both.

Another improvement to the dither correction circuit 16 includes a time out feature. The purpose of the time out feature would include protecting against extreme situations where the application of the dither signal has been stalled longer than a pre-determined length of time. This time out feature could be particularly useful on the positive dither ½ period. During low system voltage situations, it may not be possible for the current through the load to achieve the desired current. The time out feature would prevent the control circuit from waiting indefinitely.

As a person skilled in the art will readily appreciate, the above description is meant as an illustration of implementation of the principles this invention. This description is not intended to limit the scope or application of this invention in that the invention is susceptible to modification, variation and change, without departing from spirit of this invention, as defined in the following claims.

We claim:

1. A switched driver circuit for generating a switched drive signal including a dither waveform, the switched driver circuit comprising:
   a dither generator circuit having a clock input and being configured to generate a dither signal based on the clock input;
   a gate control circuit configured to generate the switched drive signal based on the dither signal;
   a dither correction circuit being configured to suspend the dither signal based on a signal parameter of the switched drive signal.

2. The switched driver circuit according to claim 1, wherein the signal parameter is a magnitude of the switched drive signal.

3. The switched driver circuit according to claim 1, wherein the signal parameter is a frequency of the switched drive signal.

4. The switched driver circuit according to claim 1, further comprising:
   a first comparator in electrical communication with the dither generator circuit and configured to generate an upper threshold signal based on the dither signal;
   a second comparator in electrical communication with the dither generator circuit and configured to generate a lower threshold signal based on the dither signal;
   wherein the dither correction circuit is configured to suspend the dither signal based on the upper or lower threshold signal.

5. The switched driver circuit according to claim 4, wherein the dither correction circuit is configured to suspend the dither signal when the upper or lower threshold signal is not received within a predefined time period.

6. The switched driver circuit according to claim 5, wherein the predefined time period is ½ of the dither period.

7. The switched driver circuit according to claim 4, wherein the first and second comparator are configured to receive a feedback signal based on the switched drive signal.

8. The switched driver circuit according to claim 4, wherein the dither correction circuit is configured to disable the clock input of the dither generator when the upper or lower threshold signal is not received within a predefined time period.

9. The switched driver circuit according to claim 8, wherein the predefined time period is ½ of the dither period.

10. The switched driver circuit according to claim 4, wherein the dither correction circuit is configured to selectively suspend the dither signal based on either the upper or lower threshold signal.

11. The switched driver circuit according to claim 1, wherein the dither correction circuit is configured to enable the dither signal when a predefined time period expires.

12. A switched driver circuit for generating a switched drive signal including a dither waveform, the switched driver circuit comprising:
   a dither generator circuit having a clock input and being configured to generate a dither signal based on the clock input;

a first comparator in electrical communication with the dither generator circuit and configured to generate an upper threshold signal based on the dither signal;

a second comparator in electrical communication with the dither generator circuit and configured to generate a lower threshold signal based on the dither signal;

a gate control circuit in electrical communication with the first and second comparator to receive the upper and lower threshold signal, the gate control circuit being configured to generate the switched drive signal;

a dither correction circuit in electrical communication with the first and second comparator to receive the upper and lower threshold signal, the dither correction circuit being configured to suspend the dither signal when the upper or lower threshold signal is not received within a first predefined time period.

13. The switched driver circuit according to claim 12, wherein the first predefined time period is ½ of the dither period.

14. The switched driver circuit according to claim 12, wherein the dither correction circuit is configured to disable the clock input of the dither generator when the upper or lower threshold signal is not received within the first predefined time period.

15. The switched driver circuit according to claim 12, wherein the dither correction circuit is configured to selectively suspend the dither signal based on either the upper or lower threshold signal.

16. The switched driver circuit according to claim 12, wherein the dither correction circuit is configured to enable the dither signal when a second predefined time period expires.

17. The switched driver circuit according to claim 12, wherein the first and second comparator are configured to receive a feedback signal based on the switched drive signal.

18. The switched driver circuit according to claim 12, wherein the switched drive circuit is a switched constant current drive circuit.

* * * * *